United States Patent
Nakajima

(10) Patent No.: US 7,059,146 B2
(45) Date of Patent: Jun. 13, 2006

(54) VEHICLE AIR CONDITIONING APPARATUS

(75) Inventor: Hiroshi Nakajima, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/739,984

(22) Filed: Dec. 18, 2003

(65) Prior Publication Data

US 2004/0129010 A1    Jul. 8, 2004

(30) Foreign Application Priority Data

Dec. 18, 2002 (JP) ............................ 2002-367055

(51) Int. Cl.
*B60H 1/32* (2006.01)
(52) U.S. Cl. .......................... 62/239; 62/244
(58) Field of Classification Search .................. 62/239, 62/244, 259.1, 262, 263, 296, 419
See application file for complete search history.

(56) References Cited

U.S. PATENT DOCUMENTS

| | | | |
|---|---|---|---|
| 4,433,020 A * | 2/1984 | Narukawa et al. | 428/113 |
| 4,898,003 A * | 2/1990 | Ichikawa et al. | 62/244 |
| 5,120,193 A * | 6/1992 | Kadle et al. | 415/119 |
| 5,182,922 A * | 2/1993 | Allread et al. | 62/239 |
| 5,775,118 A * | 7/1998 | Endo | 62/225 |
| 6,109,645 A * | 8/2000 | Totani et al. | 280/728.3 |
| 6,178,764 B1 * | 1/2001 | Tanaka et al. | 62/296 |
| 6,382,305 B1 * | 5/2002 | Sano | 165/43 |
| 6,409,590 B1 * | 6/2002 | Suzuki et al. | 454/143 |
| 6,431,257 B1 * | 8/2002 | Sano et al. | 165/42 |
| 6,601,639 B1 * | 8/2003 | Shibata | 165/42 |
| 6,609,563 B1 * | 8/2003 | Tsurushima et al. | 165/204 |
| 6,640,570 B1 * | 11/2003 | Nishida et al. | 62/244 |
| 6,753,052 B1 * | 6/2004 | Yamamoto et al. | 428/32.81 |
| 2002/0170707 A1 * | 11/2002 | Shibata | 165/202 |

FOREIGN PATENT DOCUMENTS

| | | | |
|---|---|---|---|
| EP | 1044833 A2 | * | 10/2000 |
| JP | 410306773 A | * | 11/1998 |
| JP | 11014088 A | * | 1/1999 |
| JP | 11-62896 | | 3/1999 |
| JP | 11148704 A | * | 6/1999 |

* cited by examiner

*Primary Examiner*—Mohammad M. Ali
(74) *Attorney, Agent, or Firm*—Harness, Dickey & Pierce, PLC

(57) ABSTRACT

A vehicle air conditioning apparatus for a vehicle comprises an air conditioning unit for conditioning air in a passenger compartment of a vehicle. The air conditioning unit has an air conditioning case forming an air passage with at least one sidewall. The sidewall of the air conditioning case is divided into a plurality of partial sidewalls, the thicknesses of which are different, so as to restrain vibration of the air conditioning case. The air conditioning apparatus further characterized in that the air conditioning case is installed at one of a front part and a rear part of the passenger compartment of the vehicle. The thicknesses of adjoining two of the partial sidewalls are different correspondingly to vibration restriction performance of the sidewall of the air conditioning case.

12 Claims, 4 Drawing Sheets

VEHICLE AIR CONDITIONING APPARATUS

CROSS REFERENNCE TO RELATED APPLICATION

This application is based on Japanese Patent Application No. 2002-367055 filed on December 18, the disclosure of which is incorporated herein by reference.

FIELD OF THE INVENTION

The present invention relates to a vehicle air conditioning apparatus for controlling an amount and temperature of air blown into a passenger compartment of a vehicle, such as an automobile.

BACKGROUND OF THE INVENTION

Heretofore, a vehicle air conditioning apparatus has an air conditioning unit, including a centrifugal blower, a cooler unit and a heater unit. The centrifugal blower controls an amount of air blown into a passenger compartment. The cooler unit has a cooling heat exchanger, such as an evaporator, for cooling and dehumidifying air. The heater unit has a heating heat exchanger, such as a heater core, for heating air.

The air conditioning unit is generally installed at a front part in a passenger compartment of a vehicle and provided with an air conditioning case forming an air passage. The air conditioning case is attached to a fire wall (dash panel), disposed between an engine compartment and the passenger compartment. Therefore, while vibration of an engine, disposed inside the engine compartment, or vibration of the centrifugal blower is transmitted through the dash panel, a sidewall 102 of an air conditioning case 101 is vibrated so as to generate sounds. Accordingly, the sounds are likely to be uncomfortable for a passenger in the vehicle.

Particularly, such sounds are likely to be generated in a sidewall 102 shown in FIGS. 6A and 6B, which has a very large span to a connective portion for an adjoining unit case, and an air conditioning case 101 shown in FIG. 7, having a sidewall 102 in which adjoining reinforcing ribs are disposed at large intervals. Therefore, for example, outer reinforcing ribs 103 are integrally formed wholly on the sidewall 102 of the air conditioning case 101 with a grille shape, and a rectangular board 104 is adhered to the air conditioning case 101, thereby restricting the sidewall 102 of the air conditioning case 101 from being vibrated and keeping the silence. A length h shown in FIG. 7 indicates height of the outer reinforcing rib 103. Therefore, a vehicle air conditioning apparatus disclosed in JP-A-H11-62896 (Pages 1–4, FIGS. 1–4) is provided.

However, in the conventional vehicle air conditioning apparatus shown in FIGS. 6A, 6B and 7, the air conditioning case 101 is required to be enlarged, thereby occupying room in a front part of the passenger compartment. When the room occupied with the air conditioning unit in the front part of the vehicle is restricted, the cross-sectional area of the air passage formed inside the air conditioning case 101 is required to be downsized by the projected height of the outer reinforcing rib 103 or the board thickness of the rectangular board 104. Therefore, when the evaporator and the heater core are disposed be rectangular to the flowing direction of the air flowing inside the air passage formed inside the air conditioning case 101, i.e., to occlude the air passage, heat exchange area on the evaporator or that of the heater core is reduced. Accordingly, the air conditioning performance of the air conditioning unit drops.

SUMMARY OF THE INVENTION

The purpose of the present invention is to provide a vehicle air conditioning apparatus in which an air conditioning case is downsized and restricted from being vibrated, thereby realizing to reduce noises and preventing the air conditioning performance from dropping.

According to the present invention, a vehicle air conditioning apparatus comprises an air conditioning unit for conditioning air in a passenger compartment of a vehicle. A sidewall of the air conditioning case is divided into a plurality of partial sidewalls, the thicknesses of which are different, so as to restrain vibration of the air conditioning case. Accordingly, the vibration of the air conditioning case can be restricted without outer reinforcing ribs, thereby realizing the noises of the air conditioning unit for conditioning air inside a passenger compartment of the vehicle. Moreover, the air conditioning case can be formed to be small and be constructed easily.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

In a vehicle air conditioning apparatus according to an embodiment of the present invention, each air conditioning state changeable means in an air conditioning unit 10 for conditioning air in a passenger compartment of a vehicle, such as an automobile, is automatically or manually controlled by means of an air condition controlling apparatus or a manual operation lever. The air conditioning unit 10 is disposed at a front room of a passenger compartment of a vehicle and is fixed to a fire wall (dash panel) on the passenger compartment side thereof by means of fastening means, such as a bolt or a screw. The air conditioning unit 10 has an intake unit 4, an air conditioning unit 5 and a connective duct 3. The intake unit 4 is disposed so as to offset toward a front passenger seat with respect to a central line of the vehicle in the proceeding direction thereof. The air conditioning unit 5 is disposed at a substantial center of the vehicle with respect to the vehicle width direction.

Figure 3:
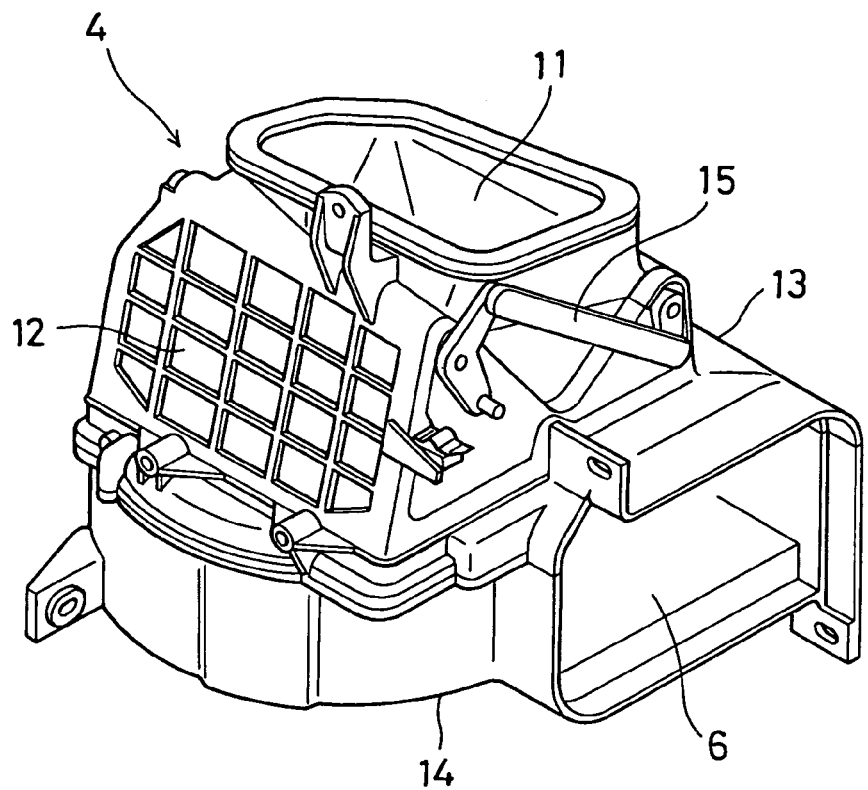
FIG. 3 is a perspective view of an intake unit of the air conditioning apparatus.

As shown in FIG. 3, the intake unit 4 includes a separated resinous case including an air inlet mode selecting means and a centrifugal blower which are integrally made of resin. The air inlet mode selecting means has an air inlet door assembly 13 including an outside air inlet 11 for drawing outside air and an inside air inlet 12 for drawing air in the passenger compartment. A plurality of air inlet doors (not shown) for switching between the outside air inlet 11 and the inside air inlet 12 is provided inside the air inlet door assembly 13. The air inlet doors can be integrally operated by means of a linking apparatus 15.

The centrifugal blower is essentially composed of a scroll casing 14, a centrifugal fan 14*a* and a drive motor 14*b*. The scroll casing 14 forms a spiral air passage 6. The centrifugal fan generates airflow in the air passage 6 of the scroll casing 14. The drive motor rotatably drives the centrifugal fan and is supported by a flange board (not shown) attached to the bottom side wall of the scroll casing 14. Moreover, a bell-mouth shaped air inlet (not shown) for drawing air toward the inner circumference of the centrifugal fan is formed at a lower part of the air inlet door assembly 13 or at an upper part of the scroll casing 14.

Figure 2:
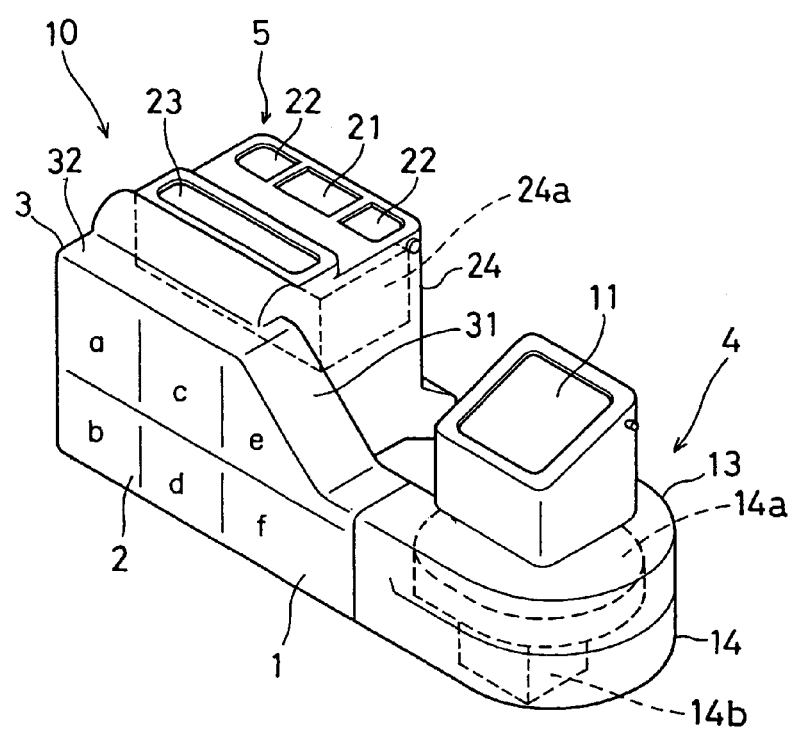
FIG. 2 is a perspective view of an air conditioning unit of the air conditioning apparatus.

As shown in FIG. 2, the air conditioning unit 5 has a separated resinous case (unit case 24), which are integrally formed with an air outlet switching means, a cooler unit 24*a* and a heater unit. The air outlet switching means has a unit case 24 including a center face opening 21, side face openings 22, a foot opening (not shown) and a defroster opening 23. A plurality of air inlet doors (not shown) for switching between the openings is operatively provided inside the unit case 24.

The center face opening 21 and the side face openings 22 are communicated with a face air outlet (not shown) for blowing conditioned air (particularly, cooled air) toward the upper body of a passenger or the inner surfaces of side windows through the use of a face duct (not shown). Moreover, the foot opening is communicated with a foot air outlet (not shown) for blowing conditioned air (particularly, heated air) toward the lower body of a passenger through the use of a foot duct (not shown). Further, the defroster opening 23 is communicated with a defroster air outlet (not shown) for blowing conditioned air (particularly, heated air) toward the inner surface of a wind shield through the use of a defroster duct (not shown).

The cooler unit includes an evaporator (not shown, cooling heat exchanger) for cooling passing air. In the cooler unit, an evaporator is stored so as to occlude the whole air passage on the upstream side of the unit case 24 with respect to the airflow direction. Further, the heater unit includes a heater core (not shown, heating heat exchanger) for heating passing air. In the heater unit, an air mix door (not shown, blowing temperature control means) is operatively stored at the upstream side or the down stream side therein. The air mix door controls an amount of air passing through the heater core and an amount of air by passing the heater core, thereby controlling temperature of air blowing into the passenger compartment.

Figure 1A:
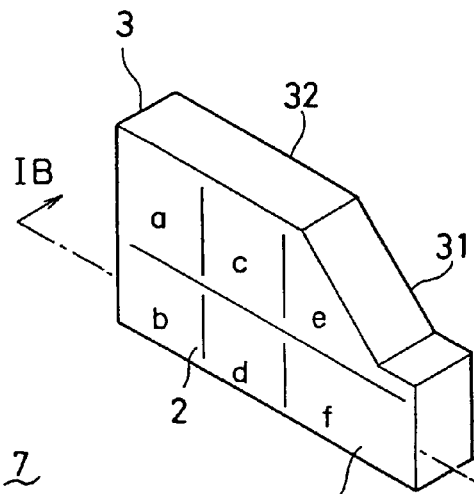
FIG. 1A is a perspective view of a connective duct connecting between an intake unit and an air conditioning unit of a vehicle air conditioning apparatus according to an embodiment of the present invention.
Figure 1B:
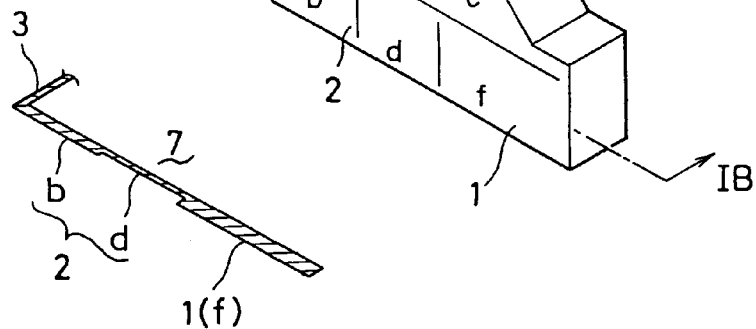
FIG. 1B is a cross-sectional view taken along a IB–IB line of the connective duct shown FIG. 1A.

As shown in FIGS. 1A, 1B and 2, the connective duct 3 is a case integrally made of resin, which air tightly connects between the intake unit 4 and the air conditioning unit 5. The connective duct 3 is communicated with the outlet of the air passage 6 of the centrifugal blower and includes an air inlet 31 and an air outlet 32. The air inlet 31 is disposed at the downstream side from the outlet of the air passage 6 with respect to the airflow direction. The air outlet 32 is disposed at a downstream side from the air inlet 31 with respect to the airflow direction and communicated with the air inlet of an evaporator disposed inside the unit case 24.

The air inlet 31 has air passages 7 in its substantially square-cylindrical first side wall 1. The first side wall 1 has a ceiling board disposed so as to slope with respect to the ground, a bottom board extended in the direction in parallel with the ground and side boards connecting between the ceiling board and the bottom board. Accordingly, the cross-sectional area of the air passage 7 becomes larger from the upstream side toward the downstream side with respect to the airflow direction.

The air outlet 32 has air passages 7 in its substantially square-cylindrical second side wall 1. The second side wall 2 has a ceiling board extended in a direction in parallel with the ground, a bottom board disposed so as to oppose the ceiling board and side boards connecting between the ceiling board and the bottom board. Accordingly, the cross-sectional area of the air passage 7 in the second side board 2 is uniform from the upstream side toward the downstream side with respect to the airflow direction.

The connective duct 3 of the air outlet 32 is formed in a manner that the air flowing from the air passage 7 formed inside the air inlet 31 into the air outlet 32 flows toward the air inlet of the evaporator in the air passage 7 formed in the air outlet 32. To put it another way, the air outlet 32 of the connective duct 3 is provided so as to be disposed in a direction substantially perpendicular to the airflow direction of air inside the air conditioning unit 5.

As shown in FIGS. 1 and 2, at least one of the first and second side boards is partitioned by a plurality of partial side boards a-f so as to restrict the air inlet 31 and the air outlet 32 of the connective duct 3 from being restricted. The partial side boards a-f respectively have predetermined areas, predetermined shapes and predetermined areas of flat surfaces correspondingly to restrict the first and second side boards of the connective duct 3 from being vibrated. Moreover, the partial side boards a-f respectively have the same thickness in the surface directions thereof.

The inner surfaces of the partial side boards a-f on the air passage 7 side are flat, and the outer surfaces of the partial side boards a-f have two-stepped shapes or multi-stepped shapes. Therefore, the cross-sectional area of the air passage 7 formed inside the connective duct 3 is not downsized. In the adjoining partial side walls e, f, of the air inlet 31 of the connective duct 3, the thickness of the partial side wall e is formed to be thicker than that of the partial side wall f (for example, about 1.5 mm) by a predetermined length (for example, about 1.5–3.5 mm).

Moreover, in the adjoining partial side walls a, b, of the air outlet 32 of the connective duct 3, the thickness of the partial side wall a is formed to be thicker than that of the partial side wall b (for example, about 1.5 mm) by a predetermined length (for example, about 1.5–3.5 mm). Further, in the adjoining partial side walls c, d, of the air outlet 32, the thickness of the partial side wall c is formed to be thicker than that of the partial side wall d (for example, about 1.5 mm) by a predetermined length (for example, about 1.5–3.5 mm).

Figure 4A:
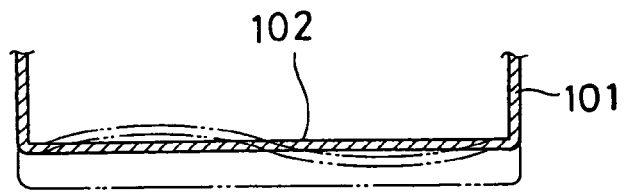
FIG. 4A is a pattern diagram showing an appearance of a vibrating sidewall of an air conditioning case of a vehicle air conditioning apparatus according to a prior art.
Figure 4B:
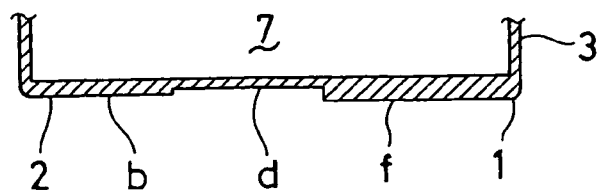
FIG. 4B is a cross-sectional view of a first sidewall or a second sidewall of the connective duct.

In the partial side boards b, d, f, as shown in FIG. 4B, the partial side walls b, f are formed to be thicker than the partial side wall d by a predetermined length (for example, about 5 mm). In this connection, the partial side boards b, f can be formed to have strange thicknesses. For example, the partial side board b is formed so that the thickness thereof is about 2.3 mm, and the partial side board d is formed so that the thickness thereof is about 1.5 mm, and the partial side board f is formed so that the thickness thereof is about 5.1 mm.

Moreover, in the partial side boards a, c, e, the partial side walls a, e are formed to be thicker than the partial side wall c by a predetermined length (for example, about 2.5–5 mm). In this connection, the partial side boards a, e can be formed to have strange thicknesses.

Hereinafter, the action of the vehicle air conditioning apparatus according to the embodiment of the present invention will be described with reference to the accompanying drawings.

While the air conditioning unit 10 is turned on, electricity is applied to the drive motor of the centrifugal blower, and thereby the drive motor rotatably operates the centrifugal fan. Next, the centrifugal fan blows out the air from the inner part to the outer part. More specifically, the outside air or the inside air is drawn from the outside air inlet 11 or the inside air inlet 12, which are selectively opened by a plurality of air inlet doors, through a bell-mouth shaped air inlet into the inner part of the centrifugal fan and is thereafter discharged into the spiral air passage 6 formed inside the scroll casing 14 from the outer part of the centrifugal fan.

The air discharged into the air passage 6 flows along the curved inner surface of the scroll casing 14 and is discharged from the outlet of the scroll casing 14 into the air passage 7 formed inside the air inlet 31 of the connective duct 3. While the air passes through the air passage 7 of the air inlet 31, the air does not cause a crosscurrent, such as a vortex flow, and flows into the air inlet of the evaporator.

The air flown into the evaporator is heat-exchanged with refrigerant sent into the evaporator by means of the compressor (not shown) of the refrigerant cycle, thereby being cooled and evaporated. After that, the amount of air heated through the heater core and the amount of air bypassing the heater core are mixed correspondingly to the opening degree of the air mix door, and thereby the temperature of the air is controlled so as to be a suitable value corresponding to the value set by a passenger. Further, the air is blown into the passenger compartment from the air outlets communicated with the openings, which are selectively opened by a plurality of air inlet mode switching doors. In this way, the temperature o the air in the passenger compartment can be controlled so as to be a predetermined value.

Hereinafter, the feature of the vehicle air conditioning apparatus according to the embodiment of the present invention will be described.

Figure 6A:
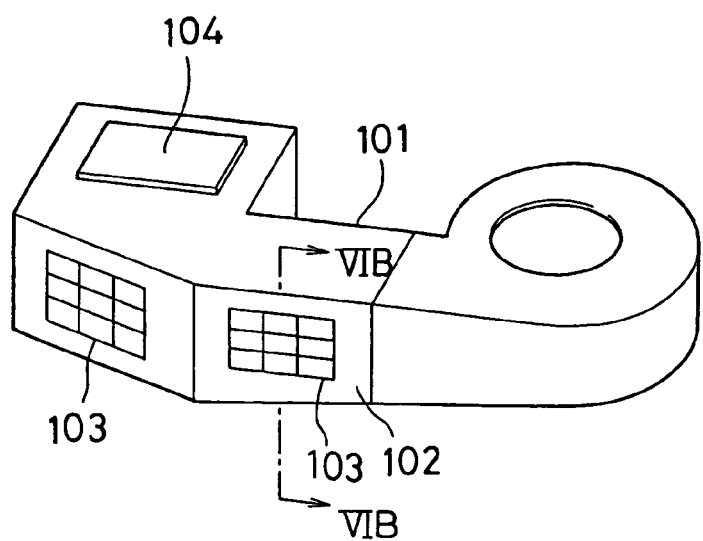
FIG. 6A is a perspective view of an air conditioning case of a vehicle air conditioning apparatus according to a prior art.
Figure 6B:
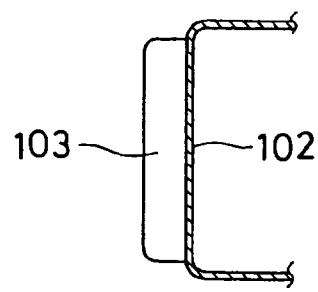
FIG. 6B is a cross-sectional view of the air conditioning case taken along a VI—VI line of FIG. 6A.
Figure 7:
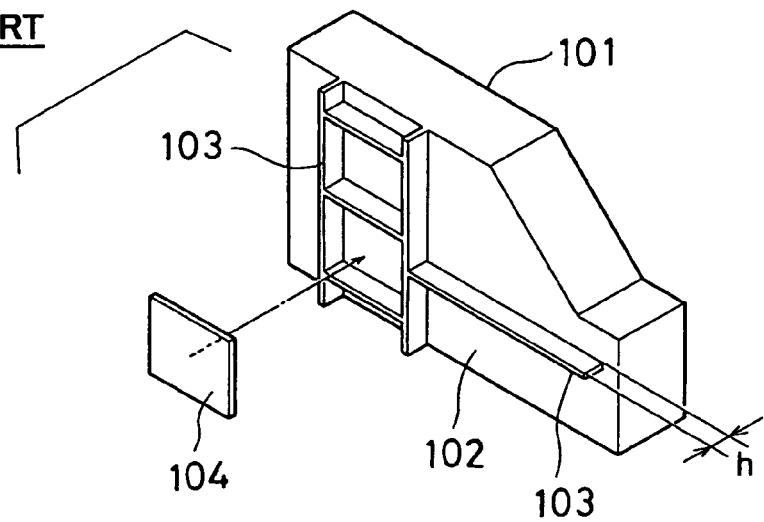
FIG. 7 is a perspective view of an air conditioning case of a vehicle air conditioning apparatus according to a prior art.

As shown in FIGS. 6A, 6B and 7, in an air conditioning unit of a conventional vehicle air conditioning apparatus, the outer reinforcing ribs 103 are formed wholly on the sidewall 102 of the air conditioning case 101 with a grille shape, and a rectangular board 104 is adhered to the air conditioning case 101, thereby reinforcing the whole sidewall 102 of the air conditioning case 101.

In the air conditioning unit 10 of the vehicle air conditioning apparatus according to the embodiment of the present invention, with reference to the vibration mode and the vibration characteristic of the first and second sidewalls 1, 2 of the connective duct 3, the respective adjoining two of the partial side walls a–f are formed to have strange thicknesses. For example, the first and second sidewalls 1, 2 of the connective duct 3 are formed integrally with resin so as to have stepped shape or unevenness shape.

In this way, the vibration modes of the first and second side walls 1, 2 and the vibration characteristics of the partial side boards a–f can be offset, thereby wholly reducing the vibrations of the first and second sidewalls of the connective duct 3. Accordingly, even though the vibration of an engine or vehicle body is transmitted to the connective duct 3 through the dash panel, or even though the motor vibration of the centrifugal blower is transmitted to the connective duct 3 through the scroll casing 14, the vibrations of the first and second sidewalls 1, 2 of the connective duct 3 is totally reduced, thereby restraining noises from generating.

Moreover, since a part of the first and second sidewalls 1, 2 of the connective duct 3 is formed to be thicker than that of the rest part, the vibration can be restrained, thereby reducing the weight of the case. Moreover, outer reinforcing ribs for restraining vibrations need not be provided. Further, rectangular boards for restraining the vibrations need not be provided.

Figure 5A:
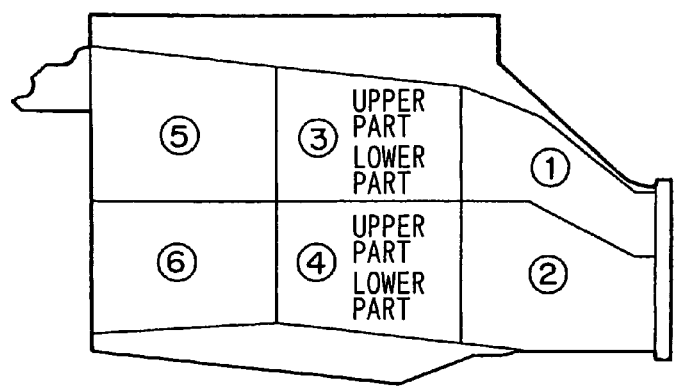
FIGS. 5A and 5B are front elevational views of sidewalls used in an experiment.
Figure 5B:
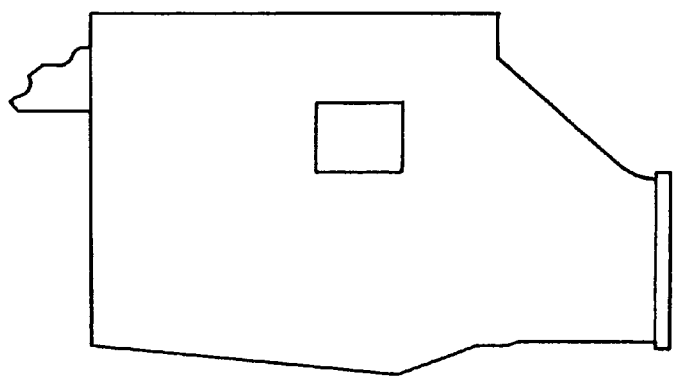

Hereinafter, a performed experiment will be described. In this experiment, two varieties of sidewalls shown in FIGS. 5A and 5b are used. The sidewall shown in FIG. 5A is divided into partial sidewalls 1–6. The sidewall shown in FIG. 5B has one rectangular partial sidewall. In this experiment, the inertance of the sidewalls in various frequenci4es are investigated. The result of the experiment is shown in FIG. 5C.

A base model (base) is an air conditioning case shown in FIG. 5B, in which the thickness of the sidewall is a predetermined length (t=2.1 mm). A first model (model 1) is an air conditioning case shown in FIG. 5A, in which the thickness of the partial sidewalls 1, 2 is a predetermined length (t=2.5 mm) and the thickness of the partial sidewalls 3–6 is a predetermined length (t=2.1 mm). A second model (model 2) is an air conditioning case shown in FIG. 5A, in which the thickness of the partial sidewalls 1, 2 is a predetermined length (t=2.5 mm) and the thickness of the partial sidewalls 3, 4 is a predetermined length (t=2.1 mm) and the thickness of the partial sidewalls 5, 6 is a predetermined length (t=1.5 mm).

A third model (model 3) is an air conditioning case shown in FIG. 5A, in which the thickness of the partial sidewalls 1, 4, 5 is a predetermined length (t=2.5 mm) and the thickness of the partial sidewalls 2, 3, 6 is a predetermined length (t=1.5 mm). A fourth model (model 4) is an air conditioning case shown in FIG. 5A, in which the thickness of the sidewalls 1, 2 is a predetermined length (t=2.5 mm) and the thickness of the upper part of the sidewall 3 and the lower part of the sidewall 4 is a predetermined length (t=1.5 mm) and the thickness of the other parts is a predetermined length (t=2.1 mm). A fifth model (model 5) is an air conditioning case shown in FIG. 5B, in which the thickness of the partial sidewall (for example, 60 mm×66 mm) is a predetermined length (t=5.1 mm).

Figure 5C:
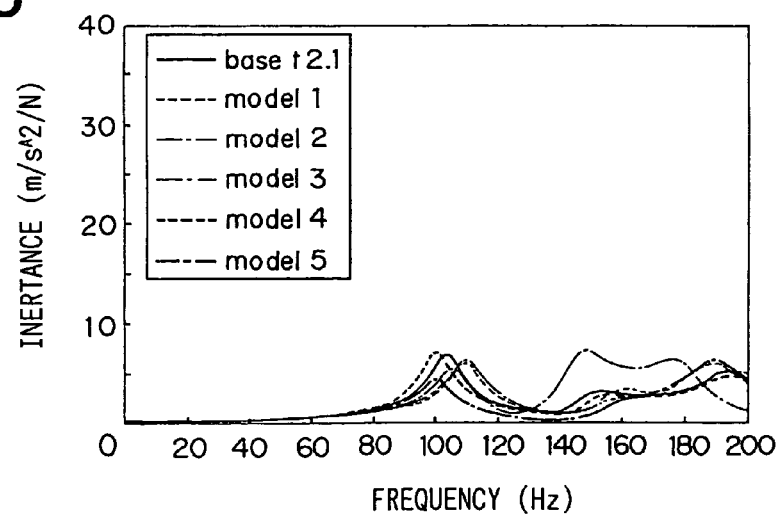
FIG. 5C is a graph showing a result of the experiment.

As indicated in FIG. 5C, a room for setting the air conditioning case (connective duct 3) of the air conditioning unit 10 of the vehicle air conditioning apparatus is used, for example, about 5 mm more, only thereby realizing to restrict the vibration. Accordingly, the air conditioning case (connective duct 3) of the air conditioning unit 10 can be formed smaller. Therefore, the air conditioning case (connective duct 3) of the air conditioning unit 10 can be smaller, and moreover the vibration of the air conditioning case (connective duct 3) can be restrained, thereby reducing noises. Moreover, even though a room for the air conditioning unit 10 provided with the air conditioning case (connective duct 3) is restrained in a front part of the passenger compartment, cross-sectional area of the air passage 7 formed inside the air conditioning case (connective duct 3) is not downsized. Accordingly, when the evaporator, the heater core or the filter is disposed so as to be perpendicular to the direction of the air passing through the air passage 7 formed inside the air conditioning case (connective duct 3), i.e., so as to close the air passage 7 formed inside the air conditioning case (connective duct 3), the effective heat-exchangeable areas of the evaporator and the heater core or the effective air filtering area of the filter cannot be small. Therefore, air conditioning performance (for example, cooling performance, heating performance and air filtering performance) can be restrained.

(Other Embodiments)

In the above described embodiment, the connective duct 3 for airtightly connecting between the intake unit 4 and the air conditioning unit 5 is provided. However, the connective duct 3 can be integrally formed with resin at the upstream side of the unit case 24 in the airflow direction or at the downstream side of the air inlet door assembly 13 or the scroll casing 14. Moreover, in the embodiment, the air conditioning unit 10 provided with the air conditioning case (connective duct 3) is installed at a front part of the passenger compartment. However, the air conditioning case (connective duct 3) can be installed at a rear part of the passenger compartment.

In the embodiment, a part of the first sidewall 1 of the connective duct 3 is formed to be thicker than the other part thereof, and a part of the second sidewall 2 of the connective duct 3 is formed to be thicker than the other part thereof. However, the thickness of a part of the sidewall of the air inlet door assembly 13 or the scroll casing 14 can be changed, or the thickness of a part of the flange board (corresponding to a sidewall). Moreover, one of the partial sidewalls a–f can be formed to be a tapering shape.

Further, one of the partial sidewalls a–f can be formed to have a projected portion or a recess. Furthermore, the inner surfaces of the partial sidewalls e, f can be formed to be projected toward the air passage 7, and the inner surfaces of the partial side surfaces c, d can be formed to be projected outward, and the inner surfaces of the partial sidewalls a, b can be formed to be projected toward the air passage 7.

In the embodiment, at least one of the partial sidewalls a-f is formed to be a rectangular shape or a substantially triangular shape. However, in accordance with the vibration restriction effect of the first and the second sidewalls 1, 2 (vibration mode and vibration characteristic), the partial sidewalls can be formed to be a polygonal shape, a circular shape or an elliptic shape. Moreover, in accordance with the vibration restriction effect of the first and the second sidewalls 1, 2 (vibration mode and vibration characteristic), the flat areas of the partial sidewalls can be formed so as to be larger or smaller.

Furthermore, the connective duct 3 can be replaced with a heater unit storing a heating heat-exchanger for heating the passing air, such as a heater core, a cooler unit storing a cooling heat exchanger for cooling the passing air, such as an evaporator, or an air conditioning case constituting a filter unit for storing an air cleaner filtering the passing air.

What is claimed is:

1. A vehicle air conditioning apparatus including an air conditioning unit for conditioning air in a passenger compartment of a vehicle, comprising:

an intake unit having an air inlet mode selecting means and a blower, the blower including a scroll casing, a fan for causing an airflow in an air passage of the scroll casing, and a motor for rotating the fan around an axis of rotation of the fan;

a cooler unit for cooling passing air; and a connective duct connecting the intake unit and the cooler unit, the connecting duct having a first end, a second end, and at least one sidewall, wherein the first end of the connective duct communicates with an outlet port of the air passage of the scroll casing, the second end of the connective duct communicates with an air intake port of the cooler unit, and the at least one sidewall of the connective duct is divided into a plurality of partial sidewall portions in a direction parallel to the axis of rotation of the fan, the plurality of sidewall portions having different thicknesses.

2. A vehicle air conditioning apparatus according to claim 1, wherein the air conditioning unit is installed at one of a front part and a rear part of the passenger compartment of the vehicle.

3. A vehicle air conditioning apparatus according to claim 1, wherein the thicknesses of adjoining partial sidewall portions are different according to vibration restriction performance of the at least one sidewall of the connective duct.

4. A vehicle air conditioning apparatus according to claim 1, wherein:

each of the plurality of partial sidewalls has a predetermined area of a plane having a predetermined shape corresponding to vibration restriction performance of the at least one sidewall of the connective duct; and at least one of the plurality of partial sidewalls is formed to have a uniform thickness.

5. A vehicle air conditioning apparatus according to claim 1, wherein:

the air inlet mode selecting means is for selectively switching between a plurality of air inlets, and the blower is for controlling an amount of air blown into the passenger compartment of the vehicle.

6. A vehicle air conditioning apparatus according to claim 5, wherein:

the intake unit is essentially conjoinedly constructed with the air inlet mode selecting means.

7. A vehicle air conditioning apparatus according to claim 6, wherein a filter unit for storing a filter that filters passing air is connected to the cooler unit via the connective duct.

8. A vehicle air conditioning apparatus according to claim 1, wherein the air conditioning unit is essentially integrally constructed with a plurality of resinous cases.

9. A vehicle air conditioning apparatus according to claim 1, wherein the at least one of the plurality of partial sidewall portions of the connective duct is on the side of a front part of the vehicle.

10. A vehicle air conditioning apparatus according to claim 1, wherein:

an inner surface of the at least one sidewall of the connective duct is flat, and an outer surface of the at least one sidewall of the connective duct has a stepped shape.

11. A vehicle air conditioning apparatus according to claim 10, wherein:

the plurality of partial sidewall portions are divided into at least an upper portion and a lower portion, wherein a thickness of the upper portion and a thickness of the lower portion are different.

12. A vehicle air conditioning apparatus including an air conditioning unit for conditioning air in a passenger compartment of a vehicle, comprising:
- an intake unit having an air inlet mode selecting means and a blower, the blower including a scroll casing, a fan for causing an airflow in an air passage of the scroll casing, and a motor for rotating the fan;
- a cooler unit for cooling passing air; and
- a connective duct connecting the intake unit and the cooler unit, the connecting duct having a first end, a second end, and at least one sidewall, wherein the first end of the connective duct communicates with an outlet port of the air passage of the scroll casing, the second end of the connective duct communicates with an air intake port of the cooler unit, the at least one sidewall of the connective duct is divided into a plurality of partial sidewall portions having different thicknesses; and the at least one sidewall of the connective duct defines a step less inner surface.

* * * * *